Fig.1

INVENTORS
Clovis W. Lincoln,
Henry D. Spiekerman, Sr.
BY Philip B. Zeigler
T. L. Chisholm
ATTORNEY

July 29, 1958     C. W. LINCOLN ET AL     2,844,970
TRANSMISSION CONTROL EXTERNAL TUBE
Filed Aug. 16, 1954                4 Sheets-Sheet 2

INVENTORS
Clovis W. Lincoln,
Henry D. Spiekerman, &
BY Philip B. Zeigler
T. L. Chisholm
ATTORNEY United States Patent Office 2,844,970
Patented July 29, 1958

2,844,970

TRANSMISSION CONTROL EXTERNAL TUBE

Clovis W. Lincoln, Saginaw, Mich., Henry D. Spiekerman, Encino, Calif., and Philip B. Zeigler, Saginaw, Mich., assignors to General Motors Corporation, Detroit, Mich., a corporation of Delaware Application August 16, 1954, Serial No. 449,832

9 Claims. (Cl. 74—484)

This invention relates to an improved transmission control linkage mounted on the steering column of a vehicle and more particulrly to a control linkage wherein the control mechanism is mounted externally of the steering column.

The manual control mechanism for automative vehicle transmissions is conventionally mounted on the mast jacket or steering column of the vehicle with the hand lever located beneath the steering wheel. The inner end of the hand lever is pivoted on the steering column and actuates the control linkage connected to the transmissions. The outer hand grip end is located beneath the steering wheel rim and is pivotally rotated about the steering column for the shifting movement and pivoted axially for the selecting movement.

In one illustrated embodiment of the invention, a control linkage mechanism, is mounted on the steering column of an automotive vehicle. The handle, having a hand grip portion adjacent the steering wheel rim, is pivoted for axial movement to a bowl or fulcrum member rigidly mounted on an external control tube mounted for rotation on the steering column. When the hand lever is rotated about the steering column axis, the bowl and control tube rotate and a lever fixed to the lower end of the control tube is connected to the transmission shift mechanism. The hand lever is also pivotally connected to a selector rod extending axially between the external control tube and the steering column which is connected to a selector lever pivotally mounted on the steering column. When the hand lever is pivoted axially the selector lever is rotated and operates the selecting mechanism of the transmission through a suitable rod.

In an alternative construction employed with transmissions merely having a shift control the selector rod provides a detent mechanism. Another modification employs two shift control levers pivotally mounted on the steering column structure and selectively clutched by the control rod to the selector rod.

An object of the invention is to provide in a control mechanism for a transmission mounted on a steering column, an improved mechanism wherein the shifting movement is transmitted by a rotatably mounted tube and the selecting movement transmitted by a rod passing between the external tube and the steering column.

Another object of the invention is to provide an improved external tube transmission control mechanism wherein the external control tube rotatably mounted on the steering column rotates to provide one control movement and mechanism is provided between the control tube and the steering column to provide the other control movement.

Another object of the invention is to provide in an external control tube transmission control mechanism, a detent mechanism operated by axial pivotal movement of the handle to limit the rotary movement of the external control tube.

Another object of the invention is to provide in an external tube transmission control linkage, a clutch to selectively engage either of two transmission operating levers in response to axial pivotal movement of the control lever.

These and other objects of the invention will be more apparent from the following description and drawings of several illustrative embodiments of the invention.

This invention relates to an external tube transmission control linkage where the external tube, mounted for rotary movement about the steering column, is rotated for the shift movement by rotation of the hand lever about the steering column. In order to provide either a detent mechanism for use in automatic transmission shifting where four-rotary positions are required or the cross shift or selector mechanism to be used with synchromesh transmissions employing the conventional H-type shift, there is additional control mechanism located within the external control tube to perform these functions without requiring axial movement of the external control tube. In a control mechanism of the H-type for a sliding gear or synchromesh transmission illustrated in Fig. 1, the axial or shifting movement of the control lever moves a rod located within the control tube axially to rotate the cross shift or selector lever located at the bottom of the steering column. In the modification illustrated in Fig. 8 which is used with sliding gear transmissions that do not have a cross shift or selector control member, the selector control is accomplished by employing the axial movement of the control rod to alternatively clutch either of the shifting levers to the external tube. In the modification illustrated in Fig. 6 which is used with automatic transmissions, the axial movement of the shift lever operates the detent which is normally used to prevent shifting into reverse unless the shift lever is pivoted axially toward the steering wheel rim.

Figure 1:
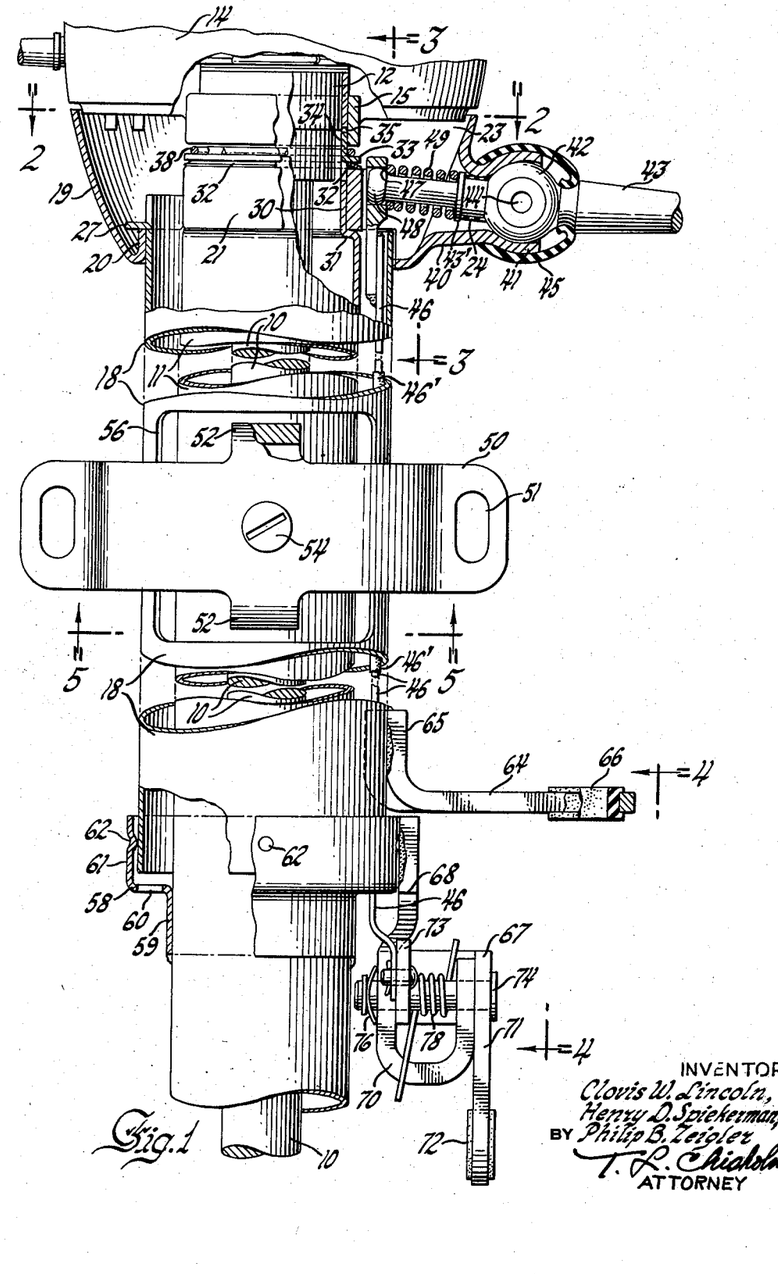
Fig. 1 shows the transmission control linkage with parts in section on the line 1—1 of Fig. 2.

The shift control linkage illustrated in Fig. 1 is mounted on a conventional steering column 11 supporting and housing the steering shaft 10. The steering shaft 10 is supported at the top in ball bearings (not shown) within the ball bearing housing 12 secured to the upper end portion of the steering column 11. The steering wheel (not shown) is fixed to the upper end of steering shaft 10. The direction signal switch housing 14 is located at the top of the steering column and has an integral central support ring 15 mounted about the steering column to support the switch housing on the column.

Figure 2:
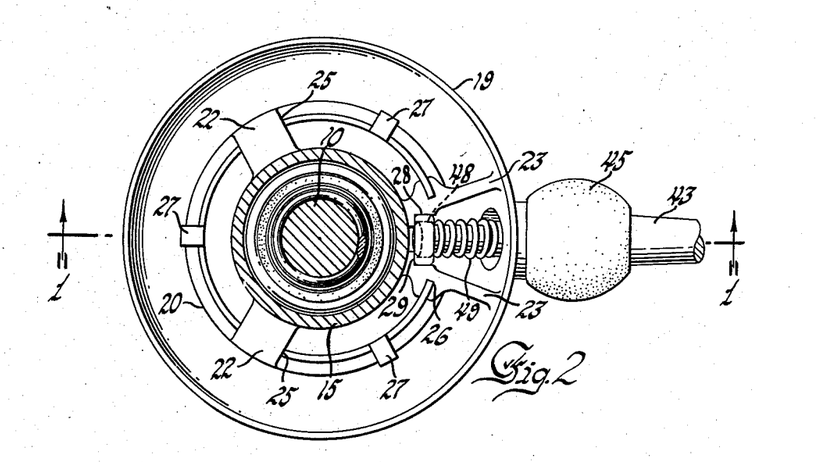
Fig. 2 is a view of Fig. 1 on the line 2—2.
Figure 3:
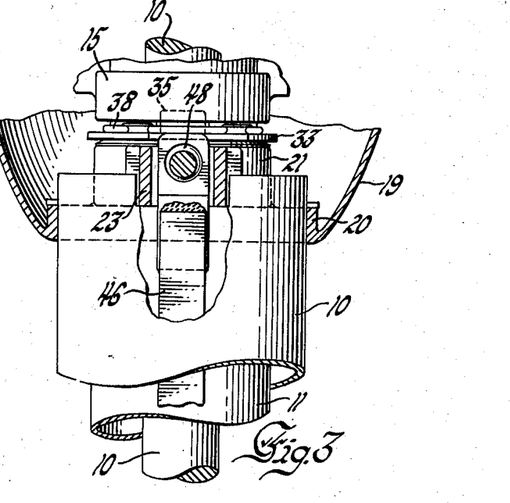
Fig. 3 is a view of Fig. 1 taken on the section line 3—3.

The cylindrical control tube 18 is positioned about the steering column and is attached at its upper end to the bowl assembly 19 which has an outer portion having a generally conical shape to form a smooth fairing line between the directional signal switch housing 14 and the control tube 18. The outer portion of bowl 19 has at its lower edge a re-entrant cylindrical flange 20 extending upwardly and contacting the outer surface of the control tube. The bowl 19 also has an inner portion or centrally located cylindrical bearing sleeve 21 of smaller diameter than flange 20 which is connected to the bowl, as illustrated in Fig. 2, by a pair of straps 22 extending from the re-entrant flange 20 to the cylindrical bearing 21 and by a pair of ribs 23 extending from the external wall of the bowl 19 past the re-entrant flange 20 to the cylindrical bearing portion 21. Thus the bowl assembly which is generally die cast in one piece, but may be made of stampings, consists of bowl portion 19, the re-entrant flange 20, the center bearing portion 21 and the interconnecting members, straps 22 and ribs 23. In order to secure the control tube to the bowl, the upper end of the control tube has recesses 25 which receive the straps 22 and a longer recess 26 providing an opening between the ribs 23. Tabs 27 located intermediate the straps and ribs are bent outwardly from the upper end wall of the control tube 18 to a position overlaying the top of re-entrant flange 20 to lock the bowl 19 to the end of the control tube. The recesses 25 prevent relative rotation and the recesses 25 and the tabs 27 prevent relative axial movement between the control tube 18 and the bowl 19. The inner opposed portions of ribs 23 are formed, as best shown in Fig. 2, to provide a pair of opposed parallel guide surfaces 28 and spaced guide surfaces 29 located tangentially of bearing sleeve 21 to guide the upper end of the selector rod 46.

The bowl and tube assembly is supported on the steering column at a reduced portion 30 which fits within and provides a bearing for the bearing portion 21 of the bowl. The lower edge of the bearing portion 21 rests on the shoulder 31 at the lower edge of the reduced portion 30 of tube 18. The Belleville spring 32 contacts the upper end surface of the bearing portion 21 to prevent relative axial movement of the bowl and tube assembly relative to the steering column 11. The Belleville spring is held in position by a washer 33 which has a tongue 34 bent upwardly and positioned in a slot 35 in the reduced portion 30 of the steering column 11 to prevent relative rotation between the washer and the steering column. A wire snap ring 38 is positioned above the washer and has inwardly extending undulations fitting into slots in the steering column to position the lock ring. Thus, the bowl 19 provides a rotatable support member for the control tube 18 on the support 11.

At one side of the bowl member, there is an outwardly extending tubular portion 40 having a socket 41 at its end to receive a ball 42 positioned between the ends of the handle 43. The handle 43 is pivoted in the socket 41 by means of a pin 44 which passes through suitable apertures in both the socket and the handle to provide for relative axial movement toward and away from the steering wheel rim but to prevent rotary movement with respect to the steering column between the handle 43 and the bowl 19. Thus the handle 43 may be pivoted axially with respect to the bowl but when the handle 43 is rotated relative to the steering column, it rotates the bowl and control tube assembly. A boot 45 of rubber or other flexible material grips the end of the tubular portion 40 of the bowl and the handle to seal the pivot.

The selector control rod 46 is mounted between the control tube 18 and the steering column 11 and has at its upper end an aperture 47 which receives the rounded end portion 48 of the handle 43. Though in the illustrated embodiment the control rod 46 is made up of two parts welded together adjacent the upper end, it will be appreciated that it may also be made in one part with the hole formed therein. The pivotal connection between the handle 43 and the rod 46 provided by the bulbous end or rounded enlargement 48 and the aperture 47 in the control rod permits sliding movement of the handle in the rod so that axial pivotal movement of the handle can move the control rod 46 axially without lateral movement. A plurality of rubber, plastic or fiber sleeves 46' may be slipped on the control rod 46 to prevent metal-to-metal contact between the rod and control tube 18 to prevent rattles. The spring 49 surrounding the end of the handle 43 engages the shoulder 43' on the handle and the face of the control rod 46 surrounding the aperture 47 to urge the rod 46 into firm contact with the bearing guide surfaces 29 on the bowl (Fig. 2) to position the rod 46 longitudinally with respect to the handle. It will be noted that there is a recess between the surfaces 29 to provide clearance for the bulbous end 48 of the handle. The guide surfaces 28 are parallel to the handle and prevent movement of the rod 46 transverse to the handle. A rubber, or other soft material, sleeve 24 surrounds the handle between the shoulder 43' and the ball 42 to provide a noise eliminating bumper for the handle.

The steering column is supported by the brackets 50 having apertures 51 at each end for attachment to the vehicle frame. The brackets 50 are shown used in a pair, each bracket having a central semi-circular portion, and the pair providing a circular support surrounding the steering column and control tube assembly. Each of the brackets has at its mid-portion an arm 52 extending from each side of the bracket toward the steering column and terminating in a curved end surface portion fitting the steering column. The screw 54 extends through a suitable aperture in the center of the bracket 50 and through the steering column to a nut or threaded abutment 55 located and secured within the steering column and formed to fit the internal surface of the steering column. The nuts 55 extend axially of the steering column to support both the inturned arms 52 of the brackets. Though it is preferred to use the brackets 50 as a pair, it will be appreciated that a single bracket can be used. The control tube 18 has an aperture 56 on each side of the steering column to permit movement of the control tube relative to the steering column 11 and the brackets 50.

Figure 4:
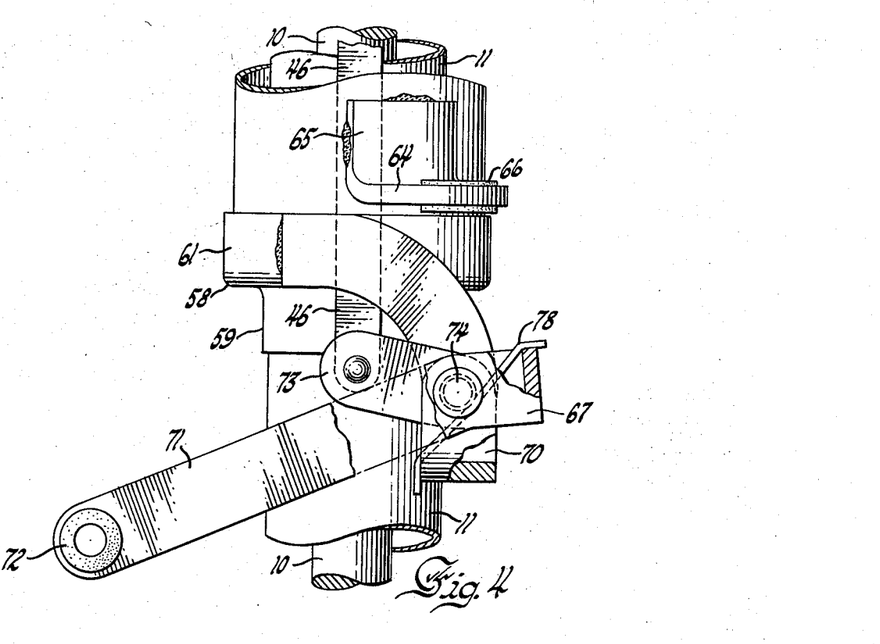
Fig. 4 is a view of Fig. 1 taken on the line 4—4.
Figure 5:
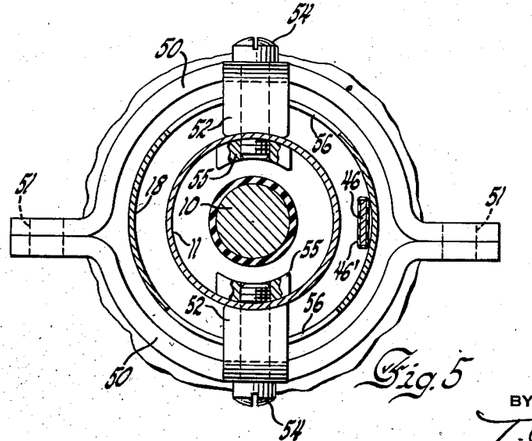
Fig. 5 is a view of Fig. 1 taken on the section line 5—5.

The control tube is laterally supported with respect to the steering column at the lower end by means of a bearing or stepped sleeve member 58 which has a lower cylindrical sleeve portion 59 of smaller diameter fitting about the steering column and secured thereto by suitable means such as welding. At the upper end of the sleeve 59 there is a radial flange 60 extending outwardly and supporting the cylindrical or sleeve bearing 61 of the bearing member. The sleeve bearing 61 extends upwardly outside of the control tube and has the plurality of inwardly pressed indentations 62 to provide a low friction bearing guide between the bearing member 58 and the control tube. The undulated spring 106 illustrated in Figure 8 may also be used between sleeve bearing 61 and control tube 18. The shift lever 64 has a laterally bent arm 65 which is secured to the control tube 18 by suitable means such as welding. A rubber bushing 66 may be positioned in an aperture at the outer end to receive a transmission shift control rod. The selector control lever 67 is mounted on a bracket 68 suitably secured to the steering column assembly by welding at its upper end to the bearing portion 61. The support bracket 68 extends downwardly in a curved direction best illustrated in Figure 4 and terminates in a U-shaped pivot portion 70. The selector lever 67 is also U-shaped and has a long arm 71 with a bushing in an aperture 72 at the end thereof for connecting a suitable transmission control rod to the lever and a short arm 73 which is located adjacent the steering column. The control rod 46 extends downwardly through a suitable aperture in the radial flange 60 of the bearing member 58 and may have an offset portion to engage the inner side of the short arm 73 of the selector lever 67 and are pivoted together by a suitable pin 75. The lever 67 is positioned in crossed relation with respect to the bracket 68 with one arm 73 of lever 67 between the legs of the bracket and the other arm 71 contacting the outside of one leg of the bracket. A pin 74 extending through both sides of the above U-shaped lever and the U-shaped support pivotally supports the selector lever for oscillating movement on the bracket 68. A suitable fastener such as the riveted washer shown or a nut and spring washer arrangement 76 retains the pin in place. The coil spring 78 is positioned on the pivot pin 74 and one end engages the base portion of the lever 67 between the arms and the other end engages the base portion of the bracket 68 at the remote edges of both members as viewed in Fig. 4 to urge the base portions together and the arm 67 to rotate in a clockwise direction to raise the control rod 46.

Figures 6, 7, 8, 9:
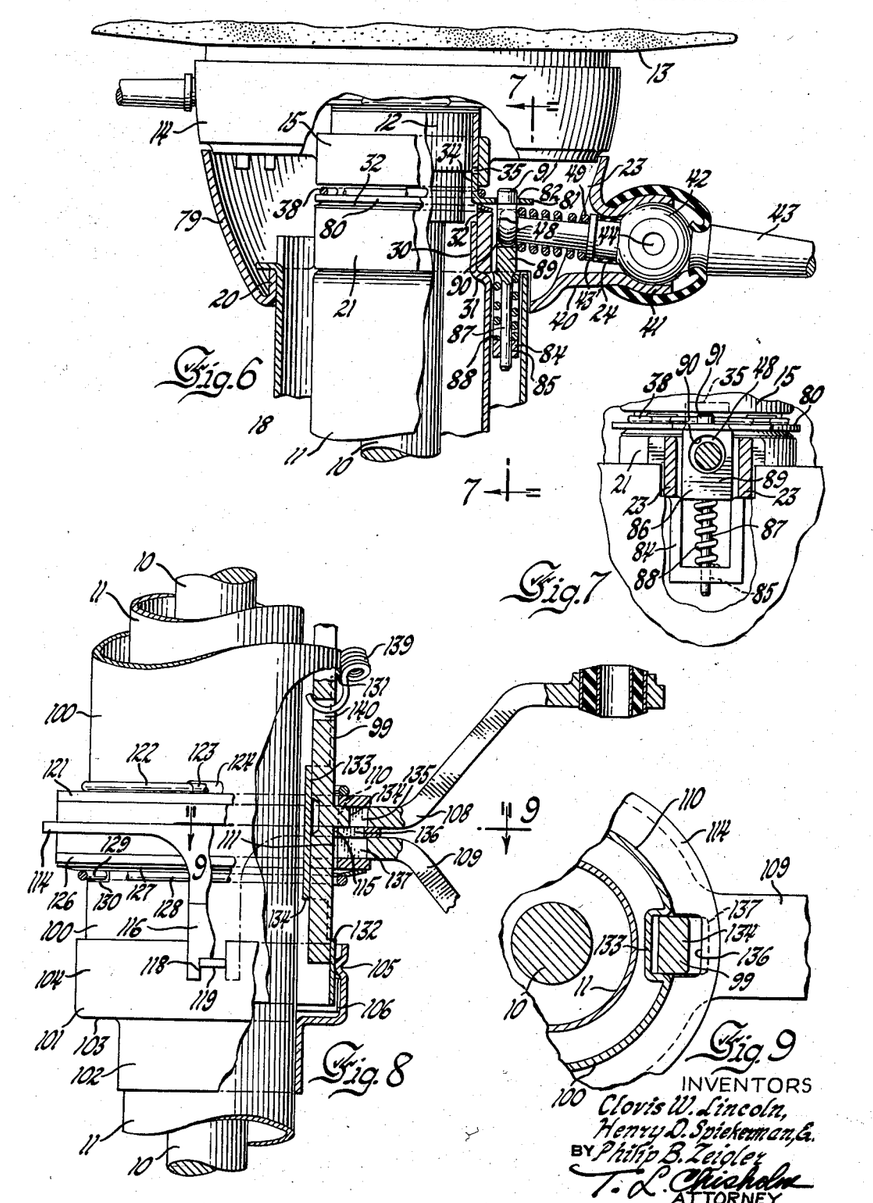
Fig. 6 is a view illustrating a modification of the upper portion of Fig. 1.
Fig. 7 is a view in section of Fig. 6 on the line 7—7.
Fig. 8 shows a modification with parts in section of the lower end of the control illustrated in Fig. 1.
Fig. 9 is a partial sectional view of Fig. 8 on the line 9—9.

A modified form of the transmission control linkage is shown in Fig. 6 which provides a four position rotary movement of the control tube 18. This control linkage could be used with any transmission requiring a rotary multiposition control mechanism such as the automatic transmissions now in use. In the following description of Fig. 6 the same numerals employed in Fig. 1 are employed where the parts have not been changed. As illustrated in Fig. 6 the steering shaft 10 is supported on the steering column 11 by a bearing 12. The direction signal switch housing 14 has a central opening defined by the supporting ring 15 which fits around the upper reduced portion 30 of the steering column 11. A portion of the steering wheel 13 is located above the direction signal switch housing. The bowl 79 has a re-entrant flange 20 connected by straps 22 and web 23 to a central cylindrical bearing member 21 which fits around the reduced portion 30 of the steering column and rests against the shoulder 31 at the lower end of the reduced portion. At the upper edge of the bearing portion 21 the Belleville spring 32 resiliently holds the bowl in place on the steering column. The Belleville spring 32 is positioned by a washer 80 which is secured by a wire snap ring 38. The washer 80 has an upturned flange 34 located within the plane of the wall of the reduced portion 30 of the steering column and positioned within an aperture 35 in this wall to prevent relative rotation between the washer 80 and the steering column. The washer 80 also has a circumferential detent extension 81 located at one side of the washer and provided with an aperture 82 to provide locking detent or stop surfaces for the control mechanism described below.

At the side of the bowl 79 between the webs 23 there is a tubular extension 40 which terminates in a socket portion 41. The ball portion 42 and the handle 43 fits within the socket and the inner portion of the handle extends through the tubular portion 40 of the bowl. The pin 44 passes through apertures in the handle and the socket to pivotally mount the handle on the bowl for pivotal movement in planes containing the axis of the steering column or axially of the steering column. A bumper sleeve 24 of rubber or other similar dampening material is positioned on the handle between the ball 42 and the shoulder 43'. There is no relative movement between the handle 43 and the bowl 79 in a rotary direction about the steering column axis and thus rotary movement of the handle rotates the bowl and control tube assembly. A U-shaped bracket 84 extends downwardly from the ribs 23 and is provided with an aperture 85 in the base of the U-shaped bracket. As best shown in Fig. 7 each arm of the U-shaped bracket is integrally formed with or attached to a web 23 of the bowl. A detent rod member 86 having a downwardly depending guide stem 87 is located within the U-shaped member and the guide stem passes through the aperture 85. A coil spring 88 is positioned about the guide stem and abuts at one end against the base of the U-shaped bracket 84 and at the other end against the enlarged head portion 89 of the detent to urge the head into engagement with the detent extension 81. The detent has an aperture 90 in the enlarged head portion 89 to receive the ball-like end 48 of the handle member. A coil spring 49 is positioned around the end of the handle and engages the shoulder 43' at one end and the head portion 89 of the detent surrounding the aperture 90 to resiliently urge the detent into sliding contact with the bearing guide surfaces 29. Lateral movement of the detent with respect to the handle is also limited by the guide surfaces 28 as explained above in connection with Fig. 2. The detent pin 91 extends from the upper portion of the enlarged head 89 of the detent member and projects when moved by the spring 88 into the slot 82 of the flange 81 of the washer. The slot 82 is generally made sufficiently long to permit shifting from neutral into forward drive positions without detent action. However, the slot is not long enough to permit the control mechanism to move to the reverse or park positions. Then it is necessary to lift the lever 43 at the outer end adjacent the steering wheel rim in order to depress the detent member 86 and remove the detent pin 91 from the slot 82 to permit movement of the control mechanism into reverse or park positions. In this control mechanism, a single lever 64 is attached to the lower end of the control tube 18 to actuate the transmission control mechanism.

A modification of the control mechanism shown in Fig. 1 wherein the clutching mechanism actuates either of two shift control levers mounted around the steering column is illustrated in Fig. 8.

This modified control mechanism illustrated in Fig. 8 may be used with the upper portion of the control mechanism illustrated in Fig. 1 and provides a clutching mechanism actuated by the control rod between the control tube 18 and two shift levers. The control mechanism shown in Fig. 1 consisting of the handle 43 and a control tube 18 and the control rod 46 is used in conjunction with the control mechanism of Fig. 8. Fig. 8 shows the lower end of the steering shaft 10 and the steering column 11 and the modified control rod 99 and control tube 100. The upper end of control rod 99 and control tube 100 are the same as control rod 46 and control tube 18 of Figure 1. The control tube 100 is supported for rotation concentrically with the steering column 11 by a stepped sleeve bearing member 101 having a small cylindrical flange or sleeve 102 surrounding the steering column and suitably secured thereto by welding. At the top of the securing flange 102 a radial portion 103 extends outwardly from the steering column and supports the cylindrical bearing sleeve portion 104. A plurality of indentations 105, preferably 3 or 4, are formed in the bearing flange 104 to reduce the friction between the bearing portion 104 and the control tube 100. A split spring member 106 having a normally larger diameter than the bearing 104 is positioned and resiliently secured within the cylindrical bearing portion 104. The spring 106 has inwardly extending undulations, preferably four, engaging the tube 100 to prevent rattling.

The upper shift lever 108 and the lower shift lever 109 both have central apertures 110 and 111 respectively which fit about the control tube 100 in order to mount the shift levers on the control tube for rotary movement. A thrust washer 114 is located between the shift levers or arms 108 and 109 and has a central aperture 115 fitting about the control tube 100 to prevent lateral shifting of the thrust washer 114. The thrust washer 114 has integrally formed therewith an opposed pair of downwardly extending arms 116 which are bent inwardly to provide ends positioned adjacent the outer surface of the cylindrical bearing member 104. A recess 118 is provided at the lower end of each arm 116 which fits over a tab or stop 119 preferably formed by bending a wall portion of the cylindrical bearing member 104 outwardly to nonrotatably secure the thrust washer to the steering column. An upper thrust washer 121 is positioned on the top side of shift lever 108 and held in position by a split wire snap ring 122 like snap ring 38 and having inwardly extending undulations 123 extending into slots 124 in the control tube 100 to retain the assembly in position. The lower thrust washer 126 engages the lower surface of the shift arm 109 and is resiliently retained in place by a Belleville or cylindrically curved spring washer 127 held in position by a wire snap ring 128 which has inwardly extending undulations 129 extending into slots 130 in the control tube 100. The shift arms 108 and 109 with the thrust washer 114 between them are thus held in position for rotary movement on the control tube 100 by the washers 121 and 126, the snap rings 122 and 128 with the Belleville spring 127 taking up the slack resulting from variations in the dimensions of the parts due to manufacturing tolerances and wear. The control tube has an upper aperture 131 and a lower aperture 132 and an intermediate wall portion 133 bent inwardly to form a U-shaped guide (Fig. 9) for the control rod 99 permitting axial sliding movement and restraining the rod 99 against lateral displacement. The rod 99 is located within the control tube 100 with the outer face engaging the inside surface of the control tube and the guide wall 133 engaging the other three sides. The outer surface of the control rod 99 is exposed throughout the opening formed by the apertures 131 and 132 and a space therebetween where guide wall 133 is located behind the control rod. A clutching dog 134 integrally formed on or secured to the outer surface of the control rod 99 projects through this opening in the control rod beyond the outer surface to cooperate with clutching elements on the shift arms 108 aand 109. The shift arm 108 has a clutch slot 135 and thrust washer 114 has a slot 136 and the lower shift lever 109 has a slot 137 for cooperation with dog 134. Each of these slots or grooves extends outwardly from the internal aperture in the shift levers and the thrust washer has a circumferential width slightly greater than the clutching dog 134. Since the axial length of the clutching dog is the same or smaller than the thickness of each of the shift levers 108 and 109, the control rod 99 may be moved either upwardly or downwardly to engage either lever 108 or 109. When the control rod is in the central position and the clutching dog 134 is in alignment with the slot 136 in the fixed thrust washer 114 the control tube cannot be rotated to shift. When the control rod 99 is in the upper position the control tube 100 may be rotated in either direction to shift the lever 108 in either direction. When the control rod is in a lower position the control tube 100 may be rotated to shift in either direction to move the shift lever 109 in either direction. The spring 139 has one end secured in aperture 140 in the control rod 99 and the other end fitted in an aperture not shown in the control tube 100 to resiliently urge the control rod 99 to the upper and generally second-third shift position.

The transmission control mechanism illustrated in Fig. 1 is intended to be employed with a synchromesh transmission of the conventional type having a shift control, a selector control and a locking mechanism to prevent improper shifting. This type of transmission employs a conventional H-type shift pattern. In this mechanism the hand lever 43 which is positioned adjacent the steering wheel rim is moved in the H pattern. When the shift lever or handle 43 is moved axially or toward and away from the steering wheel rim about the pivot pin 44, it actuates a control rod 46 through the pivotal connection provided by the bulbous end 48 of the handle and the aperture 47 in the rod. The control rod 46 moves axially of the steering column and rotates the selector lever 67. The spring 78 positioned between the selector lever 67 and bracket 68 tends to hold the selector lever in the second-third shift range in which position the rod 46 is urged upwardly and the outer end of handle 43 downwardly away from the steering wheel rod. The transmission locking mechanism prevents shifting or rotary movement of control tube 18 unless handle 43 is moved up to the reverse first range or down to the second-third range and also prevents selecting movement or axial movement of rod 46 unless the control tube and hand lever is in the neutral position. The rotary movement of the shift lever 43 after selector movement of rod 46 to either the first or reverse or the third and second position rotates the shift lever 64 in either direction to control the transmission. The handle 43 is rigidly pivoted by the pin 44 to the bowl 19 and thus cannot rotate relative to the bowl about the steering column axis. The bowl 19 is also rigidly fixed to the control tube 18 to which is rigidly attached the shift lever 64. Thus when the handle 43 is rotated about the steering column axis, the bowl, the control tube and the shift lever rotate as a unit about the steering column axis. The handle bumper sleeve 24, the rod bumper sleeves 46', and the spring 49 which positions the upper end of the rod 46 in guide bearings 28 and 29 prevent rattles.

The modification illustrated in Fig. 6 is intended to control a transmission requiring a four-position shift of a single control such as the conventional automatic transmissions. The operation of this control linkage is then similar to the shift movement of the control linkage illustrated in Fig. 1. When the handle 43 is rotated about the axis of the steering column, the handle 43, the bowl 79 and the shift tube 18 and the shift lever 64 all rotate as a unit about the axis of the steering column. During shift movement between the neutral position and the two forward drive positions of the control mechanism the handle 43 has the outer end position away from the steering wheel rim and the detent end 91 moves in the slot 82 in the washer 80. In order to prevent inadvertently shifting into reverse, and thus damaging the transmission and losing control of the vehicle, the length of the slot 82 is such as to prevent rotation of the shift lever 43 into the reverse position. In order to move the shift lever 43 into the reverse position, the outer end must be raised to depress the detent pin 91 below the washer 80 to permit this movement. When the handle 43 is moved from reverse to neutral or a forward drive position the spring 88 automatically raises the detent and the pin 91 enters the slot 82. The same detent action may be employed to prevent inadvertently shifting to other positions such as the park position where the transmission is automatically locked to provide a parking brake.

The transmission control linkage mounted on the steering column illustrated in Fig. 8 is employed with a transmission of the synchromesh type having two shift rails or forks without interlocking mechanism. The upper end of this control mechanism adjacent the steering wheel is the same as those shown in Fig. 1 and the operation is thus the same. In this mechanism the control rod 99 is provided with a clutching dog 134 which alternatively clutches either shift lever 108 or 109 to the control tube 100. A control rod 99 is normally held in the upper position in engagement with the clutching recess 135 of the second and third shift lever 108. When the clutching dog 134 is in the recess 135 of the lever 108 rotary movement of the handle 43, bowl 19, the control tube 100, and control rod 99 rotates this portion of the assembly and the shift lever 108 to either the second or third position depending on the direction of rotation from the neutral position. When shifting in either reverse or first, the outer end of the hand lever 43 is lifted toward the steering wheel rim and the control rod 99 is depressed to position the clutching dog 134 in the recess 137 of the shift lever 109. Then rotary movement in either direction of hand lever 43 from the neutral position rotates the entire assembly consisting of a bowl, control tube 100, and control rod 99 rotates the lever 109 to shift the transmission to either the second or third. The slot 136 in the intermediate thrust washer 114 is approximately the same size as the clutching dog 134 and will thus prevent selecting or movement of the control rod 99 axially with the steering column except when both levers and the tube 100 are in the neutral position. The central thrust washer 114 and the slot 136 therein which controls selecting movement of the control rod 99 is held in a fixed position by the arm 116 which is fixed to the bearing support 101 by the projection 119 in the recess 118.

While several illustrative preferred embodiments of the invention have been disclosed and described in detail,

We claim:

1. In a transmission control assembly, a support extending longitudinally along an axis, a control tube positioned externally around said support and extending axially of said support, a member rotatably mounted on said support and extending radially beyond said control tube, one end of said control tube being secured to said member to rotatably support said control tube on said support, a hand lever pivoted to said member for axial pivotal movement, said member having an axial guide recess located adjacent the inner end of said hand lever, a rod positioned in said guide recess and having a free face, a pivotal connection between the inner end of said hand lever and said rod permitting relative sliding movement between the hand lever and rod, and a spring engaging said hand lever and said free face of said rod to hold said rod in said guide recess.

2. In a transmission control assembly, a support extending longitudinally along an axis and having a groove, a control tube positioned externally around said support and extending axially of said support, a member having an inner portion rotatably mounted on said support and an outer portion located outside of said control tube, said member and control tube being rigidly fastened together, a hand lever pivotally mounted on said outer portion of said member for axial pivotal movement and being rigid with respect to said member in a rotary direction with respect to the axis, a rod, guide means on said inner portion of the member adjacent the inner end of said hand lever positioning said rod for axial reciprocating movement adjacent the inner end of the handle and preventing lateral movement, a pivotal connection between said hand lever and said rod, spring abutment means mounted with respect to said member spring means mounted between and engaging said spring abutment means and said rod to resiliently urge said rod in one direction to a normal position, and means to axially position said inner portion of said member including a fixed abutment engaging one side of said inner portion, a resilient member engaging the other side of said inner portion, and snap ring means engaging said resilient means and fitting into said groove in said support.

3. In a transmission control assembly, a support, a control tube positioned on said support and having a recess in an end edge and a tongue bent outwardly adjacent said end edge, a member having one portion rotatably mounted on said support and another portion located in contact with a side surface of said control tube and an interconnecting member rigidly connecting said portions together, and said interconnecting member being positioned in said recess and said tongue being bent over said other portion of said member to lock the member and tube together.

4. In a transmission control assembly, a support extending longitudinally along an axis and having a groove and a recess, a control tube positioned externally around said support and extending axially of said support and having a recess in the end edge and a tongue adjacent the end edge, a member having an inner portion rotatably mounted on said support and an outer portion located outside of said control tube, said outer portion including a tubular extension having a ball socket at the outer end, connecting members extending from the inner to the outer portions of said member located in said recess in the control tube and said tongue being positioned over said outer portion of said member to secure said member and control tube rigidly together, a hand lever having a ball positioned on an intermediate portion of said hand lever pivotally mounted in said ball socket of said member for axial pivotal movement and a pin connecting said ball and socket to prevent rotary movement with respect to said member in a rotary direction with respect to the axis, a rod, guide means on said inner portion of the bowl adjacent the inner end of said hand lever positioning said rod for axial reciprocating movement adjacent the inner end of the handle and preventing lateral movement, a pivotal connection between said hand lever and said rod permitting relative sliding movement longitudinally of said hand lever, spring abutment means mounted with respect to said member, spring means mounted between and engaging said spring abutment means and said rod to resiliently urge said rod in one direction to a normal position, and means to axially position said inner portion of the member including a fixed abutment engaging one side of said inner portion, a resilient member engaging the other side of said inner portion, and snap ring means engaging resilient member and fitting into a groove in said support.

5. In a transmission control assembly, a support, a control tube positioned externally around said support, a member having an inner portion and an outer portion, said inner portion being axially fixed and rotatably mounted on said support, one end of said control tube being secured to said outer portion to rotatably support said control tube externally about said support, a hand lever pivoted to said outer portion for axial pivotal movement and having the inner end located between said inner and outer portions, bearing means mounted on said support to rotatably support the other end of said control tube, a rod pivotally connected to the inner end of said hand lever and located between the inner and outer portions of said bowl and between said control tube and said support, a pair of control levers pivotally mounted with respect to said support, and means interconnecting said control tube and said rod to said control levers to transfer the control movement of said hand lever to said control levers.

6. In a transmission control assembly, a support extending longitudinally along an axis, a control tube positioned on said support and extending axially of said support, a member rotatably mounted on said support and having a portion extending radially beyond said control tube, said control tube being secured to said member to rotatably support said control tube on said support, a hand lever pivoted to said member for axial pivotal movement, a rod, said member having axial guide recess means having a lateral opening permitting lateral movement for inserting and removing said rod from said recess means and a surface engaging said rod to prevent other lateral movement, a pivotal connection between the inner end of said hand lever and said rod, and spring means fixed relative to said member and engaging said rod to hold said rod in said guide recess means.

7. In a transmission control assembly, a support extending longitudinally along an axis, a control tube positioned on said support and extending axially of said support, a member rotatably mounted on said support and having a portion extending radially beyond said control tube, said control tube being secured to said member to rotatably support said control tube on said support, a hand lever pivoted to said member for axial pivotal movement, a rod, said member having axial guide recess means having a lateral opening permitting lateral movement for inserting and removing said rod from said recess means and a surface engaging said rod to prevent other lateral movement, a pivotal connection between the inner end of said hand lever and said rod, spring means fixed relative to said member and engaging said rod to hold said rod in said guide recess means and control lever means operatively connected to said control tube at a point remote from said member to control a transmission.

8. In a transmission control assembly, a support extending longitudinally along an axis, a control tube positioned on said support and extending axially of said support, a member rotatably mounted on said support and having a portion extending radially beyond said control tube, said control tube being secured to said member to rotatably support said control tube on said support, a hand lever pivoted to said member for axial pivotal movement and fixed with respect to said member with respect to rotary movement about the axis, a rod extending axially and located between said control tube and support, said member having axial guide recess means having a lateral opening aligned with said hand lever permitting lateral movement for inserting and removing said rod from said recess means and a surface engaging said rod to prevent other lateral movement, said hand lever extending through said opening and having a pivotal connection between the inner end of said hand lever and said rod permitting relative sliding movement between the hand lever and rod, spring means fixed relative to said member and engaging said rod to hold said rod in said guide recess means and control lever means operatively connected to said control tube at a point remote from said bowl to control a transmission.

9. In a transmission control assembly, a support extending longitudinally along an axis, a control tube positioned on said support and extending axially of said support, a member rotatably mounted on said support, said control tube being secured to said member to rotatably support said control tube on said support, a hand lever centrally pivoted to said member for axial pivotal movement, a rod, said member having axial guide recess means having a lateral opening permitting lateral movement for inserting and removing said rod from said recess means and a surface engaging said rod to prevent other lateral movement, a pivotal connection between the inner end of said hand lever and said rod, and spring means fixed relative to said member and engaging said rod to hold said rod in said guide recess means.

References Cited in the file of this patent
UNITED STATES PATENTS

| | | |
|---|---|---|
| 2,231,740 | Wharam | Feb. 11, 1941 |
| 2,249,173 | Rawley | July 15, 1941 |
| 2,584,058 | Squire | Jan. 29, 1952 |
| 2,693,715 | Jochem | Nov. 9, 1954 |

UNITED STATES PATENT OFFICE
CERTIFICATE OF CORRECTION

Patent No. 2,844,970                                    July 29, 1958

Clovis W. Lincoln et al.

It is hereby certified that error appears in the printed specification of the above numbered patent requiring correction and that the said Letters Patent should read as corrected below.

Column 9, line 42, after "abutment" insert -- on said support --.

Signed and sealed this 28th day of October 1958.

(SEAL)
Attest:
KARL H. AXLINE
Attesting Officer

ROBERT C. WATSON
Commissioner of Patents